March 11, 1924.
W. R. GREEN
1,486,658
TIRE CARRIER FOR AUTOMOBILES AND THE LIKE
Filed Feb. 1, 1922
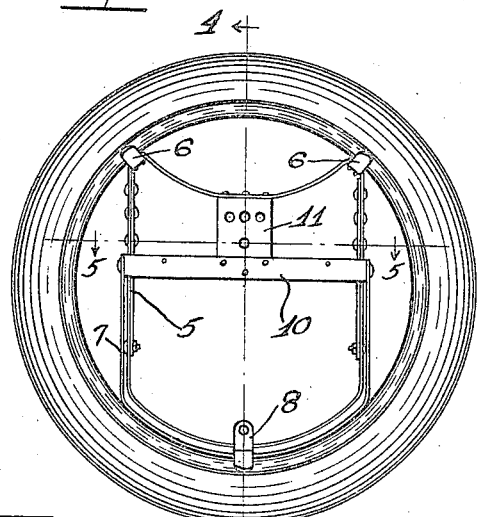
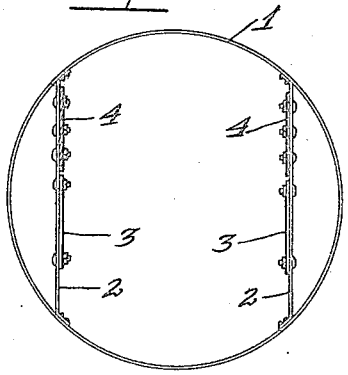
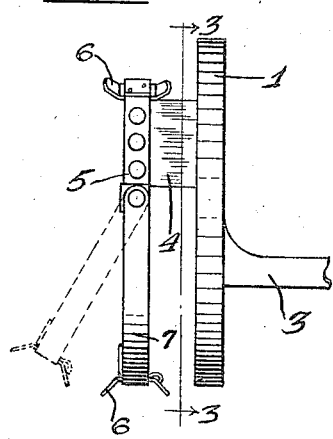
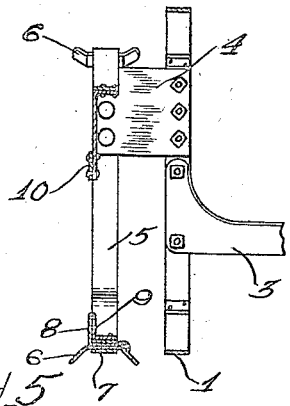
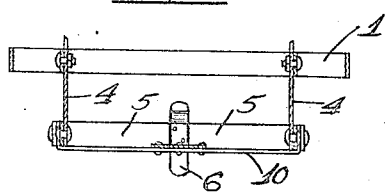
WITNESSES
Rudolph T. Berg.
Carlton Steel
INVENTOR
WALTER R. GREEN.
By
Atty.

Patented Mar. 11, 1924.

1,486,658

UNITED STATES PATENT OFFICE.

WALTER R. GREEN, OF CHICAGO, ILLINOIS.

TIRE CARRIER FOR AUTOMOBILES AND THE LIKE.

Application filed February 1, 1922. Serial No. 533,206.

*To all whom it may concern:*

Be it known that I, WALTER R. GREEN, a citizen of the United States, and a resident of the city of Chicago, in the county of Cook and State of Illinois, have invented certain new and useful Improvements in Tire Carriers for Automobiles and the like; and I do hereby declare that the following is a full, clear, and exact description of the same, reference being had to the accompanying drawings, and to the numerals of reference marked thereon, which form a part of this specification.

This invention relates to tire carriers for automobiles and the like, and it is an object of this invention to provide a novel form of auxiliary carrier that can be readily applied to the standard carrier with which certain new automobiles are equipped.

It is a further object of this invention to provide an auxiliary that does not interfere with the operation of removing a tire from or restoring one on the standard carrier.

With these and other objects in view which will become more apparent in the following description and disclosure in the drawings, this invention comprises the novel mechanism and combination hereinafter described and more particularly pointed out and defined in the appended claims.

In the accompanying drawings which illustrate a preferred embodiment of this invention and in which similar reference numerals refer to similar features in the different views:

Figure 1 is an elevational view of the auxiliary carrier with a mounted tire thereon and supported in the rear of the standard tire carrier.

Figure 2 is an edge elevational view of the combined tire carrier with the tire removed from the auxiliary carrier.

Figure 3 is a section on the line 3—3 of Figure 2.

Figure 4 is a section on the line 4—4 of Figure 1.

Figure 5 is a section on the line 5—5 of Figure 1.

In referring now to the different figures of the drawings, it will be observed that there is illustrated an annular ring member 1 representing any ring type of standard carrier that constitutes part of the initial equipment of an automobile.

In carrying out this invention, a pair of flat metal strips 2 are secured interiorly of the member 1 in parallel and spaced relation. The supporting brackets 3 may be attached to the strips 2 below the center thereof, and the auxiliary tire carrier may be attached to the upper part thereof by means of the plate members 4 which are adapted to be bolted or secured to the strips 2, and riveted or otherwise secured to the auxiliary carrier 5.

The auxiliary carrier 5 comprises a rigid metal form made from a flat strip of metal with upper and lower concave portions and parallel sides. Tire holding prongs or devices 6 are secured transversely of the upper corners. The auxiliary carrier further comprises a U-shaped swingable member 7 pivoted to the parallel sides of the metal form and surrounding the lower portion thereof. The lowermost point of said member 7 is provided with the transverse member 6 which constitutes the tire holding prongs, and secured in superposed relation upon the prong 6 is an angle clip 8 having an upwardly extending flange which abuts a similar flange in an angle clip 9 secured interiorly of the bottom of the metal form 5 when the swingable member 7 is in normal position. The abutting flanges of the angle clips 8 and 9 are provided with alined apertures whereby a padlock or the like may be applied thereto for locking the swingable member against movement.

If desirable a license plate support 10 may be attached at its ends to the sides of the metal form and supported intermediate its ends by a plate member 11 secured to the upper concave portion of the form and bolted to the support 10.

It should be particularly noted that the auxiliary carrier comprises a lower pivoted member that can be readily swung out of the way so as not to interfere with the removal of a tire from the standard carrier 1, or the restoration of one thereon. While the drawings show a tire mounted upon a clincher rim of the demountable type, supported upon the auxiliary carrier, it should be understood that the term "tire" is intended to include a tire whether mounted upon a rim or not.

I am aware that numerous details of construction may be varied through a wide range without departing from the principles of this invention, and I therefore do not purpose limiting the patent granted otherwise than necessitated by the prior art.

I claim as my invention:

1. The combination with a main tire carrier, of an auxiliary carrier having a pivoted tire carrying portion swingable away from the main carrier, and means for supporting said auxiliary carrier on the main carrier.

2. In a tire carrier, a ring-like carrier, supports secured interiorly of said member, oppositely extending brackets secured to said supports, and an auxiliary carrier secured to one of said brackets and comprising a member swingable in a transverse plane to said ring-like carrier.

3. The combination with a tire carrier, of an auxiliary tire carrier having a rigid portion connected to said first tire carrier and having a pivoted tire supporting portion swingable in a transverse plane to said first carrier.

4. In a tire carrier, a tire supporting member and an auxiliary member secured thereto, one of said members being rigid and the other having a pivoted tire supporting portion swingable in relation to the other.

In testimony whereof I have hereunto subscribed my name in the presence of two subscribing witnesses.

WALTER R. GREEN.

Witnesses:
CARLTON HILL,
JAMES W. O'BRIEN.